United States Patent
Liu et al.

(10) Patent No.: US 10,009,575 B1
(45) Date of Patent: Jun. 26, 2018

(54) STORAGE METHOD FOR LOSS-TOLERANT DATA STREAM RECORDING

(71) Applicant: Viakoo, Inc., Mountain View, CA (US)

(72) Inventors: Manqing Liu, Los Gatos, CA (US); David Nelson-Gal, Palo Alto, CA (US)

(73) Assignee: Viakoo, Inc., Mountain View, CA (US)

( * ) Notice: Subject to any disclaimer, the term of this patent is extended or adjusted under 35 U.S.C. 154(b) by 0 days. days.

(21) Appl. No.: 15/628,249

(22) Filed: Jun. 20, 2017

Related U.S. Application Data (60) Provisional application No. 62/359,063, filed on Jul. 6, 2016.

(51) Int. Cl.
| | |
|---|---|
| H04N 7/18 | (2006.01) |
| H04N 5/94 | (2006.01) |
| H04N 5/765 | (2006.01) |
| H04N 7/08 | (2006.01) |
| H04N 5/956 | (2006.01) |
| H04L 29/08 | (2006.01) |

(52) U.S. Cl.
CPC ............... *H04N 5/94* (2013.01); *H04N 5/765* (2013.01); *H04N 5/956* (2013.01); *H04N 7/0806* (2013.01); *H04N 7/181* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 2014/0122796 | A1* | 5/2014 | DeKoning | G06F 12/0862 711/114 |
| 2016/0350078 | A1* | 12/2016 | Fenney | G06F 7/72 |
| 2017/0168925 | A1* | 6/2017 | Partlow | G06F 12/023 |

* cited by examiner

*Primary Examiner* — Eileen M Adams
(74) *Attorney, Agent, or Firm* — David H. Jaffer; Pillsbury Winthrop Shaw Pittman (57) ABSTRACT

A distributed storage of sequential video frames is designed without compromising data reliability. Capitalizing on the loss-tolerant nature of video data, user experience is maintained by leveraging higher capacity drives with lower latency, higher throughput and more efficient utilization of provisioned storage. No RAID, replication or erasure computations are necessary. There are a few optimization to this method which improves reliability, such as reliably storing video data in partitioned drives, making data storage configuration map known to each partition, implementing a strategy for avoiding loss of a common moment, preventing potential loss of reference frames, leveraging different sized drives, avoiding pitfalls associated with data getting stored disproportionately to large drives etc. Though video streaming data has been used as an illustrative example of loss-tolerant data, the methods and systems can be applied to any type of loss-tolerant data.

16 Claims, 10 Drawing Sheets

Parity-based Policy Example (RAID 5)

Each drive contains configuration of active video streams & frames within the drive

STORAGE METHOD FOR LOSS-TOLERANT DATA STREAM RECORDING

CROSS-REFERENCE TO RELATED APPLICATIONS

This application claims the benefit under 35 USC 119(e) of prior co-pending U.S. Provisional Patent Application No. 62/359,063, filed Jul. 6, 2016, the disclosure of which is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present application relates to loss-tolerant data storage. More specifically, the present application discloses dynamic allocation of video data for storage across a plurality of drives and efficient playback.

BACKGROUND

Loss Tolerant Data

Video data, especially video surveillance data, demands ever greater amount of space in storage systems. As camera resolution and frame rates get higher, sensors emitting video data get more proliferated, and/or the number and complexity of configurations being monitored increase, the aggregate data generated gets more voluminous and, as a consequence, requires more and more storage. To meet this need, system administrators are presented with the choices of either adding ever-larger collections of storage drives, or, adding higher capacity drives to existing configurations, or both. The drive industry can now offer drive size exceeding 10 Terabytes (TB) and drive storage capacity is only likely to continue to increase. Unfortunately, traditional approaches to keep data storage reliable, such as, data replication, erasure encoding and Redundant Array of Independent Disks (RAID) methods, become liabilities as drive capacity exceeds 6 TB in size. Also, there are significant costs to provision extra storage capacity for these solutions. Additionally, the replication and recovery mechanisms introduce complexity which affects reliability and performance.

For example, most RAID configurations require identically sized drives to support their RAID policy correctly, reducing flexibility to leverage advances in storage capacity per drive. Most importantly, as drive size gets large, when a failed drive must be replaced, the vast size of these new drives requires a tremendous amount of time to "rebuild" the redundancy to restore the system to full protection. Rebuilding time is the time taken to either replicate the lost mirror or parity configuration in the replacement drive so that the system again has the capacity to tolerate a subsequent drive failure. During this rebuild time, the system is vulnerable to another drive failure. Specifically, another failure may cause the loss of all the information in the storage configuration. As various industries deploy drives of massive capacity, this rebuild time can stretch into several weeks or longer, increasing the chances that the valuable data stored on these systems will be lost entirely due to subsequent failures before the rebuild process has completed.

Problems associated with data loss due to drive failure/malfunction is particularly acute for certain kinds of data, for example, bank transactional data, stored data structures, configuration information, event logs etc., where every bit of data matters, because each piece of data may have unique and impactful significance. Any data loss can create a critical situation, deeply compromising system or human stakeholders of the data.

For other kinds of data, specifically certain kinds of streaming data, the information comes repeatedly, potentially timestamped for resequencing later, and has the characteristic of both its preceding and following data. These characteristics create a potential extrapolation of the missing piece. In other words, this type of data is loss-tolerant.

Figure 1:
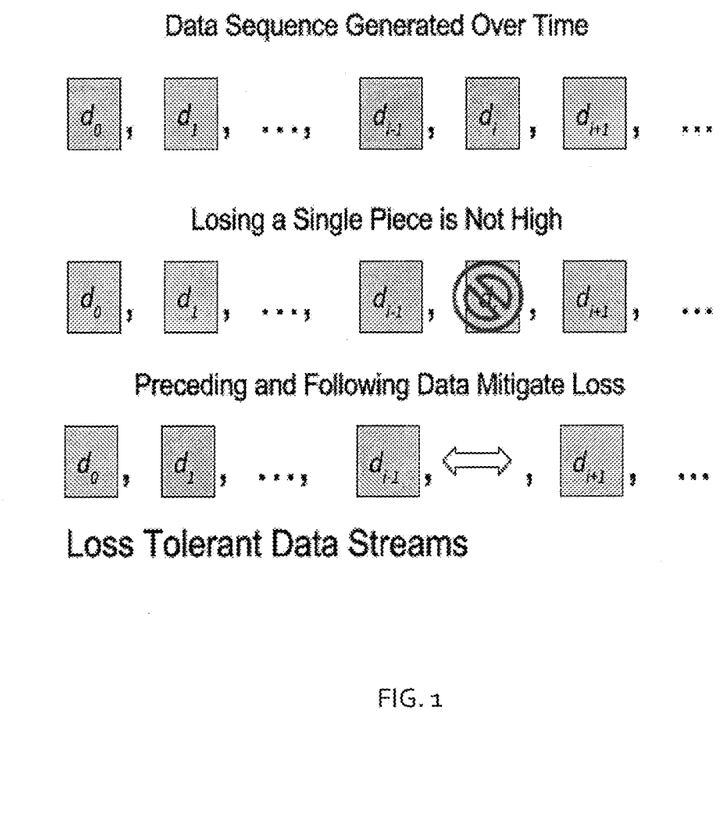
FIG. 1 illustrates an example of loss-tolerant data.

An example of loss-tolerant data is shown in FIG. 1. The data might be a stream of data from a sensor, indicating amount of current on an electrical wire. This sensor issues a reading every few seconds for the purposes of monitoring energy use in an office building. It could be sending current readings. If an appliance is turned on immediately after the $(i-1)^{th}$ time of data collection, sensor reading in $d_i$ is significantly higher than $d_{i-1}$. If the entire data stream is lost, there is no easy way to know the amount of energy in the wire for time period of the lost data. However, the loss of just $d_i$ is not horrible because $d_{i+1}$ will contain the higher reading as well. Ideally, it is preferred not to lose any data, but losing a piece of data $d_i$ is not catastrophic.

Video stream data is a sequence of video frames captured over a window of time, and has this loss-tolerant property depending on the application. For video surveillance applications, there is also a finite lifetime of the video data defined as video retention requirement, which further limits the value of going to excessive lengths to preserve every video frame.

Since video is in the form of multiple images (up to 30 or more frames) per second, the consequence of data loss could be only partial and the perception of this loss is in the form of small fractions of lost video for an overall healthy stream. There are different compression strategies that put higher values on some frames over others, but, instead of going to great lengths to preserve every piece of data, if there is a solution that merely mitigates degradation to gain higher efficiencies and robustness for the overall stream, then there is a potential for improvement over traditional methods. Furthermore, if the solution can support complex video encodings, it may be extended to nearly any loss-tolerant data stream.

Existing Storage Mechanisms

Storage drives are physical and complex devices with moving mechanical and solid-state electronic components. They are also complex systems with embedded controlling software and protocols. In this reality, an individual drive, no matter how well it was manufactured, is likely to fail at some point after it has been put into service. If the data stored on these drives is important, then there is a need to design some reliability through redundancy.

Redundant Array of Independent Disks, abbreviated as RAID, is a method that offers automatic redundancy to counter this problem of individual drive failure. RAID is a data storage virtualization technology that combines multiple physical disk drive components into a single logical unit for the purpose of data redundancy and performance improvement. By placing data on multiple drives, input/output (I/O) operations can overlap in a balanced way, improving performance. A RAID controller is a hardware device or software program or a combination of hardware and software used to manage disk drives in a computer or a storage array so they work as a logical unit.

To keep things simple in a RAIDed storage system, applications write to filesystems a single file and the underlying filesystem or storage subsystem supporting the filesystem takes responsibility for retaining the data reliably even in the context of drive failures. The most common approaches are either replicating the data across multiple drives or using computational methods that can derive any lost information when a drive fails.

Replication is a commonly used scheme to counter the undesirable consequence of drive failure. RAID 1 policy replicates blocks of data being stored on a mirrored set of drives. Hadoop Filesystem replicates at the file level across multiple systems using multiple drives.

Figure 2:
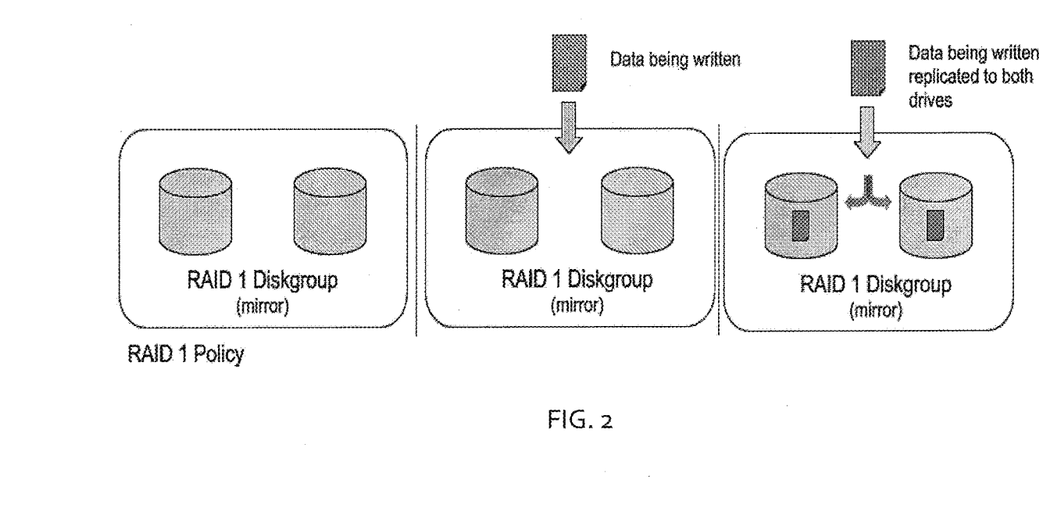
FIG. 2 illustrates replication policies such as RAID 1.

Replication policies such as RAID 1, shown in FIG. 2, save a block-for-block copy on each drive. This prompts at least twice as much storage available since the data is getting written twice. It is somewhat efficient as the work can be done in parallel.

Figure 3:
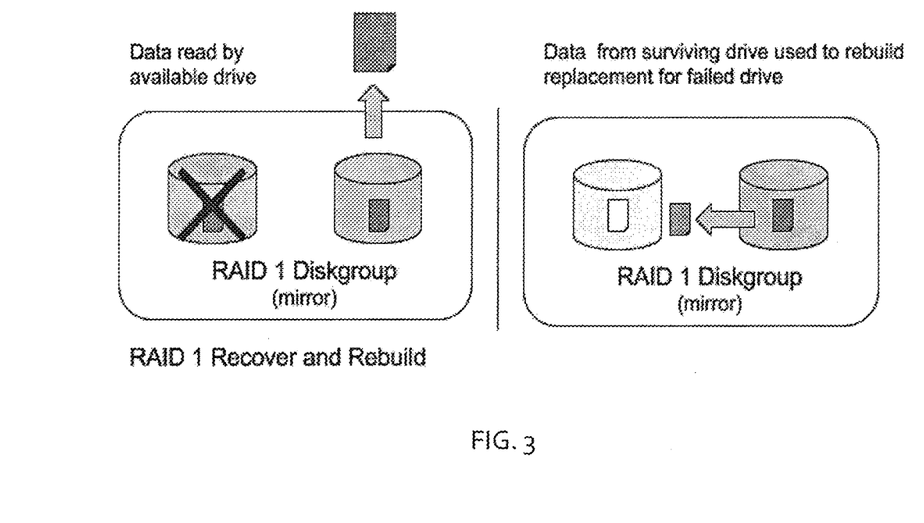
FIG. 3 illustrates retrieval of data from the surviving drive(s) in the event of a drive failure.

When a drive fails, as shown in FIG. 3, the data is retrieved from the surviving drive(s). When a new replacement drive is added to the configuration, the Replication manager must rebuild the new drive to make it an identical copy of the surviving drive to restore the disk group to full protection.

The benefit of this method lies in the performance to write data since the writing can be done in parallel. In some cases, such as HFS, data can be read in parallel, providing greater capacity. The penalties of this method lie in the extra costs of duplicating, triplicating (or making even more copies), the amount of storage required to gain the extra reliability and performance. Moreover, when replacement drives are added, the rebuilding work is the time to copy over all the data from the surviving drive(s) to the new drive.

Compute-based policies address the shortcomings, such as added cost to support replication-based policies. To support a single terabyte of storage in a replication-based policy, the user must purchase 2 terabytes (or more depending on the policy). Compute-based policies like RAID 5, RAID 6 and Erasure Coding techniques allow for fewer than 2× number of drives and still support reliable storage.

Figure 4:
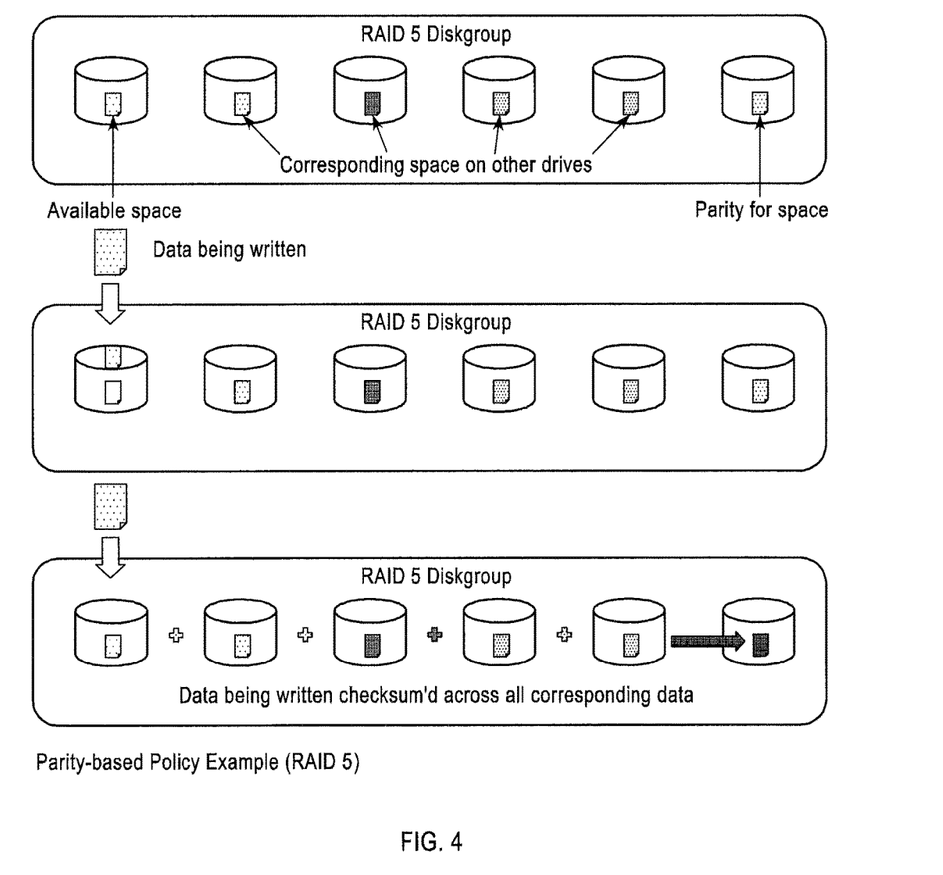
FIG. 4 illustrates an example of RAID 5, where a single extra drive is used to save parity information for sectors of user data stored on the remaining data drives in a disk group.

In the example of RAID 5, shown in FIG. 4, a single extra drive is used to save parity information for sectors of user data stored on the remaining data drives in a disk group. In this way, a group of 5 drives can be made reliable by adding only a $6^{th}$ parity drive (as opposed to 5 more drives if replication was used).

A drive is configured as an array of blocks of storage. A disk group builds a collection of drives that all have the same number of blocks of storage (i.e., same size). If there are 'n' drives in the disk group, each drive may be labeled as $D_1$, $D_2$, $D_3$, ... $D_n$ with an extra drive $D_{n+1}$ to use for computation.

Each block in a disk is a collection of bits (0 or 1) and if the disks in the disk group are all the same size 'm' number of blocks, then each block is addressable as $D_iB_j$ where 'i' corresponds to the disk number in the disk group and 'j' corresponds to the block in that disk.

New data getting written in block 'x' of drive 'y' prompts a computation to determine a value to store in the parity drive:

$$D_{n+1}B_x = F(D_1B_x, D_2B_x, \ldots, D_yB_x, \ldots, D_nB_x)$$

For RAID 5, the operator F( ) is XOR.

Then, if any drive is lost, all blocks within the collection of drives can be reconstituted by using the same formula, as follows:

$$D_yB_x = F(D_1B_x, \ldots, D_{y-1}B_x, D_{y+1}B_x, \ldots, D_nB_x, D_{n+1}B_x)$$

Figure 5:
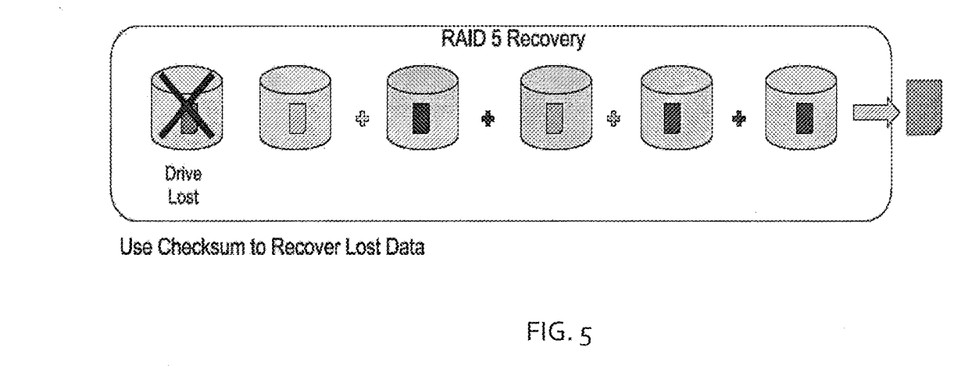
FIG. 5 illustrates use of checksum to recover lost data in case of a drive failure in RAID 5.
Figure 6:
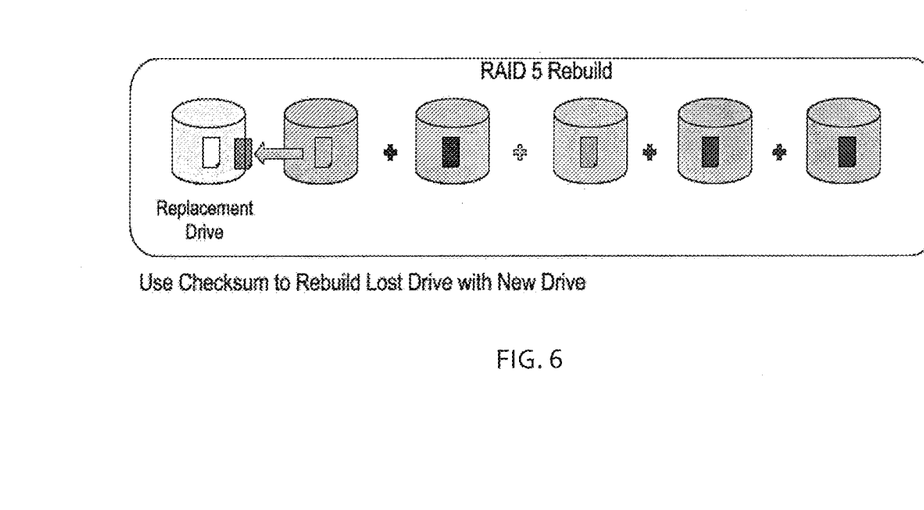
FIG. 6 illustrates rebuilding a lost drive using checksum in RAID 5.

Moreover, when a new drive is added back into the configuration, the new drive can be rebuilt using this same calculation across each block of storage in the new drive. This is shown in FIGS. 5 and 6.

The benefits of this technique lies in that there is a much smaller overhead in capital costs in terms of extra storage to provide reliability. The down side is associated with the performance cost in terms of computing and latencies in writing new parity blocks every time an actual data block gets written as well as the cost of computing missing data when a drive fails. As the capacity of disk drives get bigger, rebuild time can take weeks and the data integrity is no longer guaranteed due to the limited un-correctable read error. Finally, as with replication, the replacement drive rebuild costs associated is expensive with this parity calculation needed for every block of storage when a new replacement drive gets added to such a configuration. This rebuilding not only takes time to compute but also takes time to read blocks from all the other drives to compute the proper data to store in each block in the replacement drive.

This technique can be made more reliable by adding extra parity drives while increasing the overhead per byte of usable storage and resulting latencies associated with parity calculations.

All these costs maybe reasonable in situations where absolute data integrity is an inherent requirement. However, for some kinds of data, like surveillance video, these costs maybe too onerous. For example, if you use 10TB drives, the time rebuild a lost drive, data retention periods may already have passed. Because of these advancements in drive capacity, video data presents special challenges and opportunities to design storage solutions that provide good enough reliability in a cost effective way.

Problems in Existing Storage Mechanisms to Handle Video Data

Video data streams are a flow of many frames (images) in sequence over a window of time. Metadata associated with each stream is expressed as image-resolution, frame- rate (measured in. Frames-per-second, i.e., fps), encoding standard (also known as codec), etc. Depending on the requirements, users may choose to adjust any or all of these parameters to improve their systems performance and quality.

Common encoding standards are MJPEG, MPEG4 , H.264, H.265 et cetera. MJPEG is a simple stream of individual frames. An individual high-resolution camera (e.g., 10 Megapixels or more) running at 30-frames-per-second with MJPEG can generate a massive amount of data. Losing one or two frames of data is akin to a section of a film being taken out of the middle of a scene. The scene appears to jump at that point.

Other codecs leverage the fact that only a fraction of each image may vary from the previous image, allowing transmission and storage of only the differences between images with periodic reference frames used to ensure that overall base image quality is maintained. For example, when a frame or two of these kinds of codecs get lost in transmission through interruption in communication of satellite television signal, a viewer may see a somewhat pixelated section of the screen where some subsets of the image (i.e. small rectangles on the screen) show residual images from an earlier scene. Eventually, more data arrives, and the image appears whole.

For video surveillance systems, users may choose to record video data from a plurality of cameras (numbers may vary from a few cameras to several thousand cameras) on a continuous basis. All this video data is only useful if something happens in the scene that is interesting and needs to be preserved and analyzed. Otherwise, it is merely consuming space on disk until its retention window is reached and then it is deleted to make room for the constant stream of new video data being created.

What is important about these systems is that the video is stored long enough to react to specific events, examples of which include:

Investigating a break in or skirmish,

Understanding traffic patterns within a store,

Understanding a quality breakdown in a manufacturing facility.

Different institutions have different requirements as to how long to retain the data. The greater the dependency on greater resolution cameras, higher frame rates, and longer retention requirements, the greater is the need to harness the benefit of new generation of hard drives to save data. Unfortunately, as mentioned earlier, the onerous rebuilding costs associated with these extremely large hard drives makes them a liability when using replication or computational means for making drives reliable. Therefore, for the vast majority of video surveillance data has a fixed lifetime. Most videos are kept for a specified duration, called a retention period. After the retention period, the video data will be deleted. The retention goal ranges from days to years depends on the requirement.

Varying degrees of unused capacity to defend against any one drive failure is costly. Moreover, the performance penalties associated with writing and reading this data can force a degree of overprovisioning as well. However, the final liability is that as the storage capacity of a single drive gets large, the amount of real time required to rebuild replacement drives to return the configuration to a fully defended system is approaching the point of making these systems unreliable if large capacity drives are used.

For large capacity drives, RAID is no longer applicable. The un-correctable read error will cause data integrity and the weeks of rebuild causes system vulnerable of losing all of its data due to drive failures. The performance penalty of erasure coding mechanism makes it not suitable for streaming live videos.

The system design of trying to create a reliable storage subsystem where Video Management System (VMS) applications can write data files arbitrarily to storage and the storage subsystem takes care of it, is approaching practical limits where increasing drive size to accommodate growing space requirements can lead to catastrophic impacts when drives fail. The alternative is to only use smaller drives, forcing multiple, distinct disk groups to avoid large latency impacts or massive windows of replacement drive rebuilding time.

SUMMARY

This disclosure provides a solution to the above problems by implementing distributed storage of sequential video frames without compromising data reliability. Capitalizing on the loss-tolerant nature of the video data, user experience is maintained by leveraging higher capacity drives with lower latency, higher throughput and more efficient utilization of provisioned storage. No RAID, replication or erasure computations are necessary for the disclosed solution to work with desired efficacy. There are a few optimization to this method which improves reliability, such as reliably storing video data in partitioned drives, making data storage configuration map known to each partition, implementing a strategy for avoiding loss of a common moment, preventing potential loss of reference frames, leveraging different sized drives, avoiding pitfalls associated with data getting stored disproportionately to large drives etc. Though video streaming data has been used as an illustrative example of loss-tolerant data, the methods and systems of this disclosure can be applied to any type of loss- tolerant data.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

The distributed storage solution disclosed here are applicable to video data, and takes advantage of some of the unique aspects of video data, including but not limited to the following:

Video data is a sequence of video frames (images) that are time-stamped;

While appreciating that the loss of a full sequence of video frames is potentially catastrophic, it is recognized that the loss of an individual frame may be a small, and often unnoticeable fraction of the overall video stream. (e.g., losing one frame of video shot at 8 frames per second may not be a noticeable problem.)

Limited retention time of video data means it may be deleted before rebuild is complete, in case of long rebuild times.

Based on the above and other related observations, a system is disclosed where the video recording mechanisms store data in a distributed pattern across a collection of directly mounted drives. No RAID, replication or erasure computations are necessary. Capitalizing on the loss-tolerant nature of the video data, user experience is maintained by leveraging higher capacity drives with lower latency, higher throughput and more efficient utilization of provisioned storage.

The disclosed method recognizes that a single drive failure may lose a percentage of video frames (images) of video but not full video sequences. Therefore, there is no need to rebuild replacement drives. New drives just start getting freshly recorded video.

Base Method for Recording

For an arbitrary video camera C, a video stream from that camera arrives at a recording server as a continuous array of video frames. Even for codecs that make an assumption about the previous frames provide the next increment of video data in the form of a frame. Therefore, for a single camera, C, a video stream from that camera, $VS_C$, would appear as:

$$VS_C = [f_0, f_1, \ldots, f_{i-1}, f_i, f_{i+1}, \ldots]$$

Figure 7:
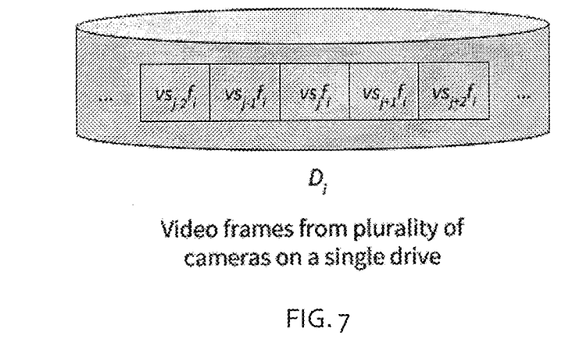
FIG. 7 illustrates video frames from a plurality of cameras coming to a single drive, according to an embodiment of the present disclosure.
Figure 8:
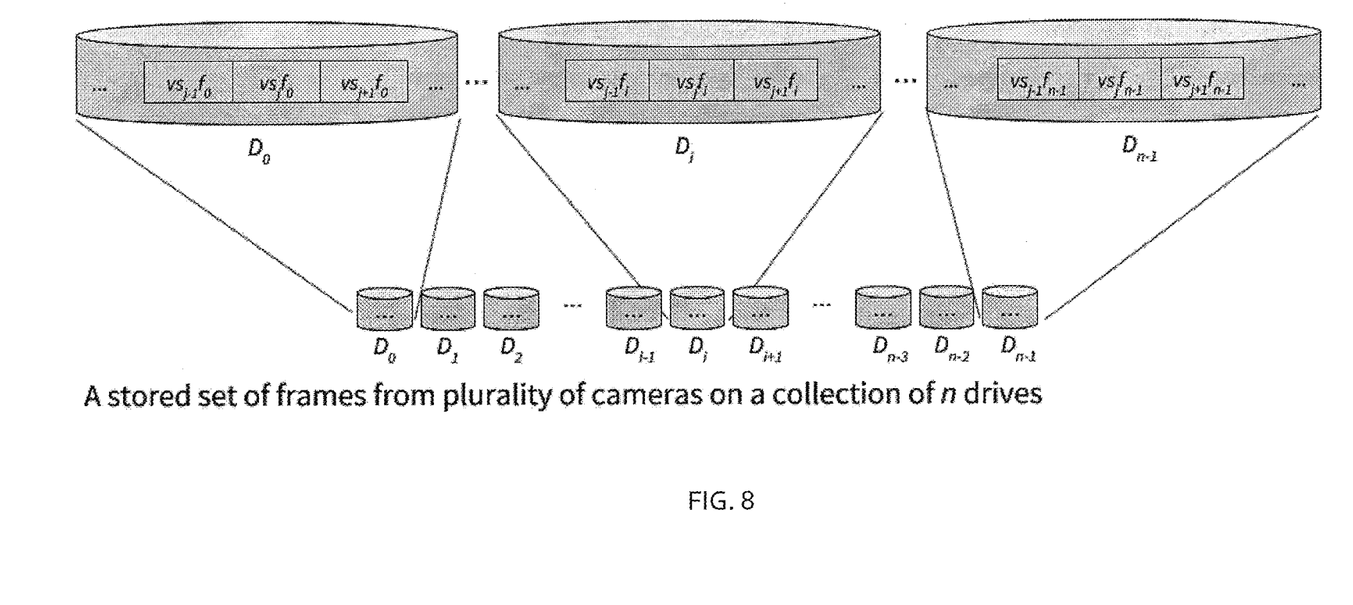
FIG. 8 illustrates a stored set of frames from a plurality of cameras on a collection of 'n' drives, according to an embodiment of the present disclosure.

FIG. 7 shows video frames from a plurality of cameras coming to a single drive. For a recording system with 'n' drives mounted, as shown in FIG. 8, the system would store data for an individual camera C, a video frame $f_i$ would be written into drive $D_j$ where:

$$j = i \bmod n$$

In this way, frame $f_0$ would be written to drive $D_0$, frame $f_1$ would be written to drive $D_1$, and so on, till frame $f_N$, which will be written into $D_0$, and so forth.

For a collection of video streams coming from a plurality of cameras, frames from each video stream are stored separately to facilitate playback on-demand and deletion according to retention policies. However, the stream recording follows a similar pattern. If there are 'm' number of video streams, the system would store:

$$[VS_0 f_i, VS_1 f_i, \ldots, VS_m f_i] => D_{i \bmod n}$$

Figure 9:
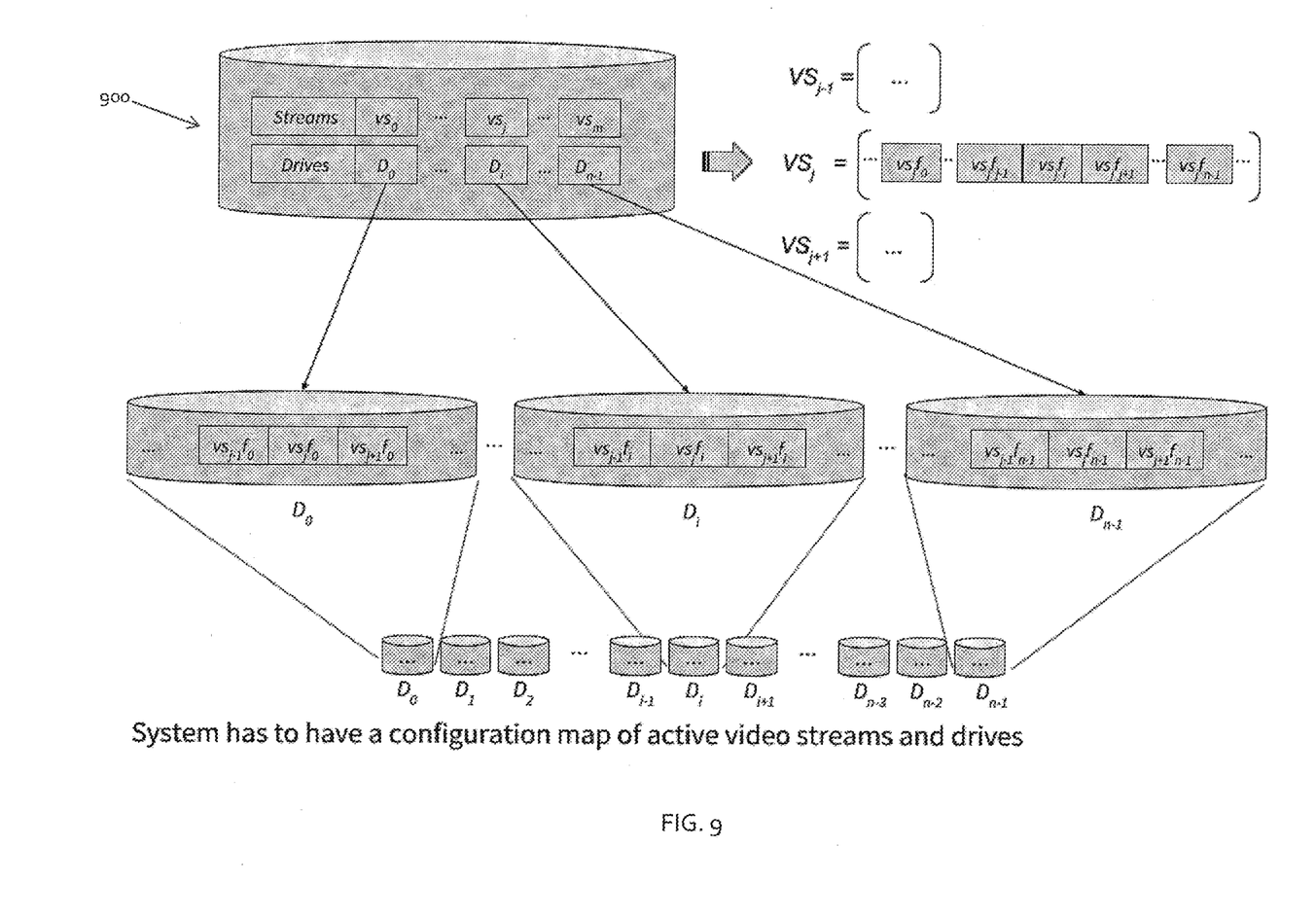
FIG. 9 illustrates that the system having a configuration map of active video streams and drives, according to an embodiment of the present disclosure.

To manage the process of playing back recorded video on-demand, the system needs to have a mechanism to understand the configuration of video streams and drives and storage patterns of video streams that track frames on drives so it can read and reconstitute frames associated with a video stream and re-collate the individual streams into time sequence. FIG. 9 shows a configuration map 900 corresponding to a system shown in FIG. 8.

Figure 10:
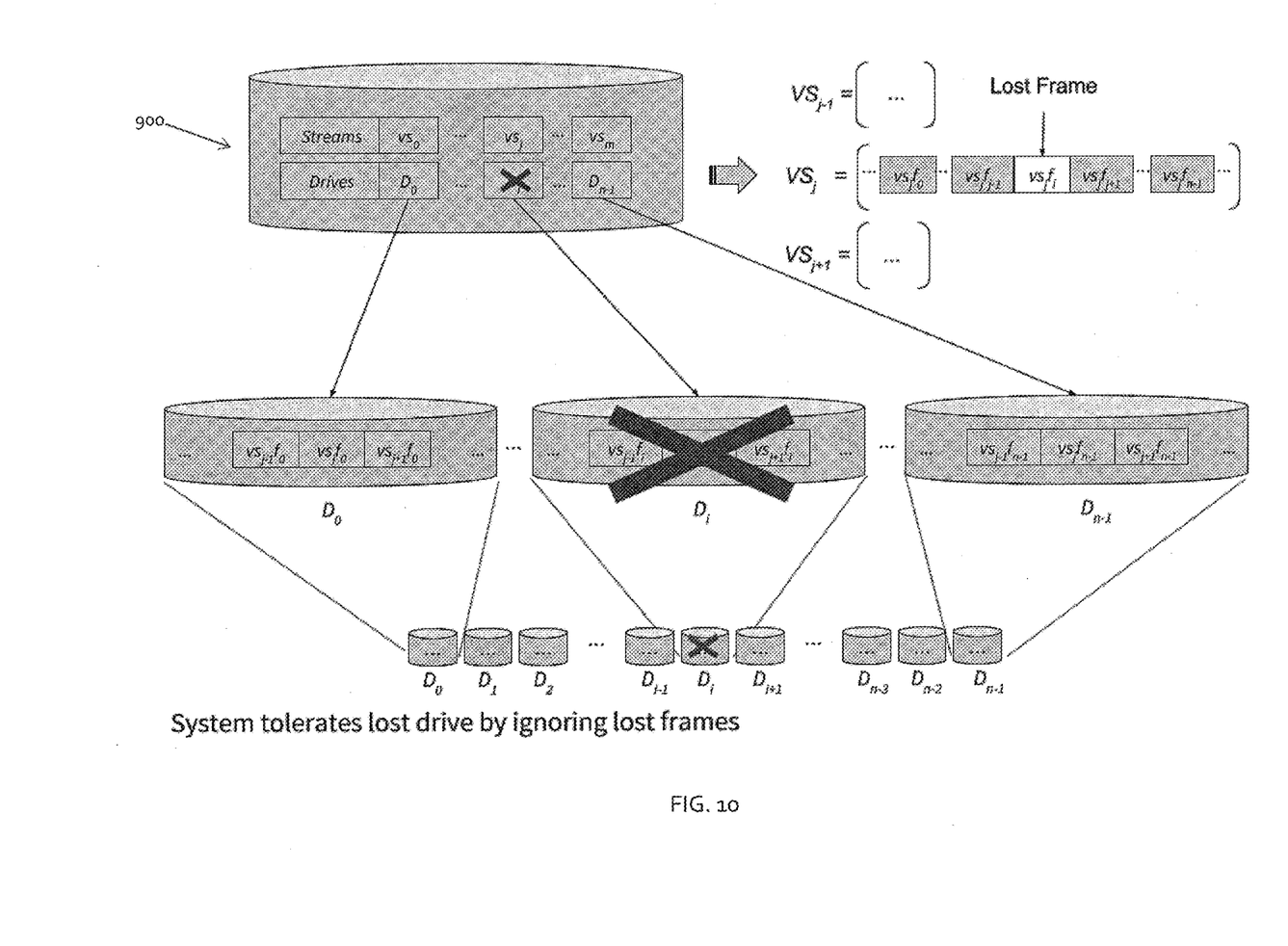
FIG. 10 illustrates how the system tolerates a lost drive by ignoring lost frames which is reflected in the updated configuration map, according to an embodiment of the present disclosure.

If any drive fails, as shown in FIG. 10, the writing of frames to the drives need to skip the failed drive and write frames as if the failed drive was never part of the collection (i.e., the number of drives in the collection would be (n-1)). The configuration map is updated too. Note that drive unavailability may be caused by total or partial failure of a drive requiring a rebuild, or, the drive being off-line for scheduled maintenance When a replacement drive gets introduced to the system, it is automatically added into the configuration map 900, restoring the collection to n drives. At this point, video frames, in the proper sequence, can start recording to the new drive again.

Using this method, if a single drive, $D_i$ fails, the loss would impact only $1/n^{th}$ the video frames. The greater the number of drives is, the lower is the impact of a single drive failure. As an example, a simple, 4-drive configuration would lose 25% of the video data with a single failure and may not be appropriate for this technique. However, many video recording systems consist of 12-drive RAID configurations in single 2U chassis. Extra chassis, referred to as expanders, or higher drive density chassis can increase the number of drives associated with a single recorder to 50 or more individual drives. With the above described method, an individual drive failure may have a near imperceptible impact.

More importantly, unlike with aforementioned existing methods to protect storage, where each block of storage has to be recreated in the replacement drive as part of a rebuilding process, there is only a small initialization cost commensurate with drive and filesystem initialization, some of which can be done prior to the drive being added to the configuration map. These initialization costs are roughly the same irrespective of the size of the replacement drive.

Base Method for Playback

The method for playback of a sequence of video stream $VS_j$ between time $t_x$ to time $t_{x+y}$, which is equivalent to finding and sorting all the frames from $VS_j f_x$ to $VS_j f_{x+y}$ is described as follows:

define VideoFrame [ ] PlayBackVideoStream;

for each drive $D_k$ where $0 \leq k \leq N-1$ insertSort based on timestamp all frames in $D_k$ $vs_j f_i$
           from where $x \leq i$         $\leq x+y$ into VideoFrame [ ]

In this way, an arbitrary sequence of surviving frames can be retrieved from active drives and can be re-sequenced back to form a meaningful stream of data.

Optimizations on the Base Method

The disclosed distributed storage method provides some significant performance and efficiency improvements, operating fairly well with the small penalty of losing small fractions of the data. As discussed above, in some applications, such as, video surveillance, losing a small fraction of individual frames of a video stream is not as important as having cost, space and retention efficiency along with overall system and video stream reliability.

There are a few optimization to this method which improves reliability, such as reliably storing video data in partitioned drives, making data storage configuration map known to each partition, implementing a strategy for avoiding loss of a common moment, preventing potential loss of reference frames, leveraging different sized drives, avoiding pitfalls associated with data getting stored disproportionately to large drives etc.

Configuration Optimization

There are two pieces of information regarding the configuration that allows the method to function more reliably:

What are currently available partitions to store video data. These are the mounted drives that are available to be used for storing new video data. This collection can be dynamic in that new drives can be mounted or failed drives removed.

Where video stream data for each camera might be stored.

Knowing the above information makes partition (mounted drives) configuration reliable. The collection of available partitions to be used by the video storage system should be stored with the operating system and could be automatically derived from currently mounted partitions known to the operating system. To make the operating system partition reliable, tradition RAID replication (e.g., RAID 1 mirroring) can be the most effective solution.

The video stream configuration must also be reliable. The video management system (VMS) must have a reliable way of finding stored video frame data for each video stream within each partition (drive) so it can reassemble it later for playback. Having a reliable way of finding the video stream data is as important as having a reliable way of storing it in the first place. Like the available partition (drive) configuration mentioned above, it is possible to store the video stream storage configuration with the operating system partition.

Figure 11:
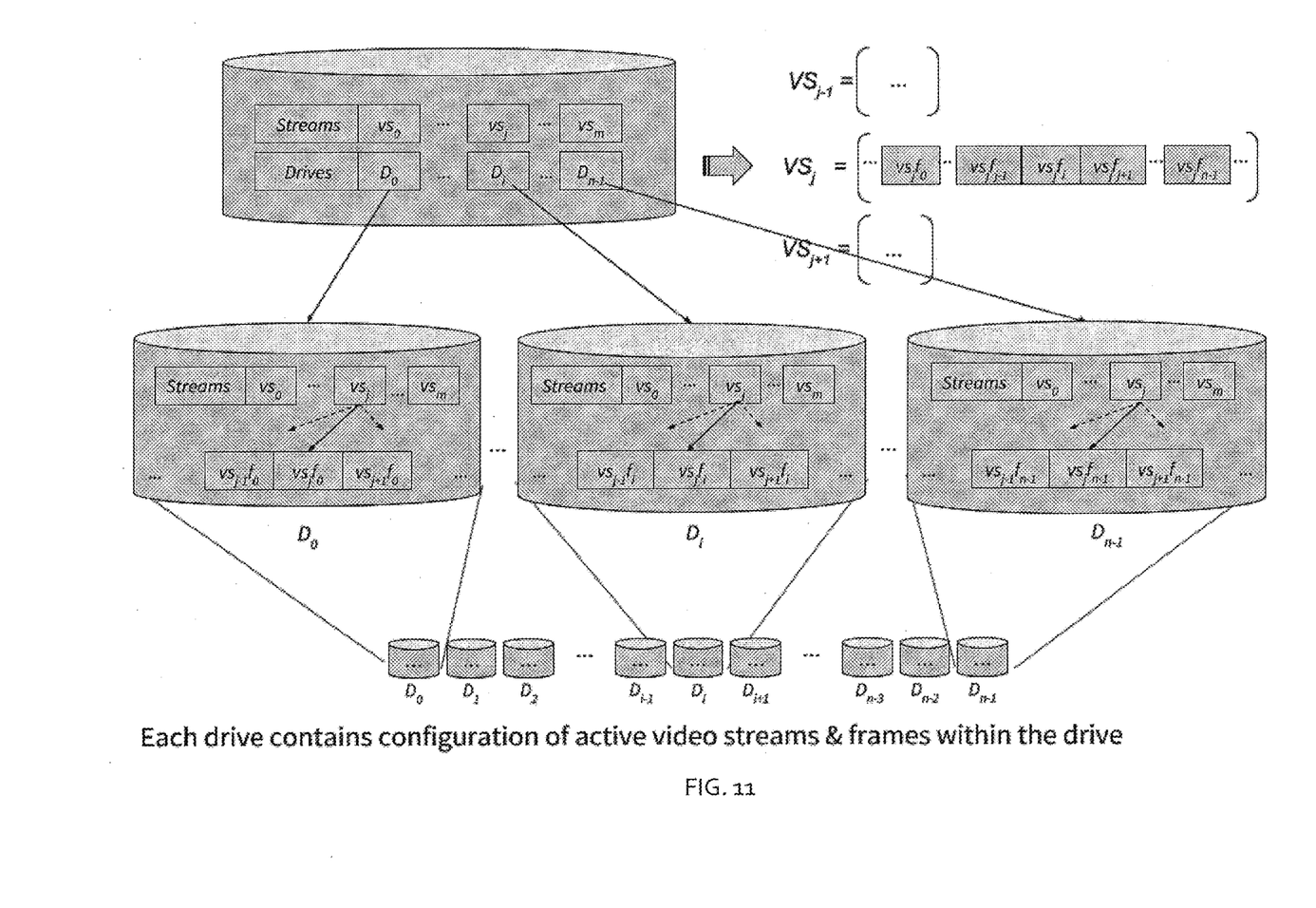
FIG. 11 illustrates an example of configuration map in the individual drives or partitions, according to an embodiment of the present disclosure.

Another technique is to put the video stream frame configuration information in the individual drives themselves, as shown in FIG. 11. This can be in the form a database located in a consistent location on each partition (drive) $D_0, D_1, \ldots D_{n-1}$, providing information about where each video stream frame might be stored. This can also be within the hierarchical file-system of the mounted partition (drive). For example, each video frame could be stored as separate files within a folder associated with an individual video stream, from an individual camera, uniquely identified by its IP address. Each frame includes metadata about the time it might have been captured.

In this way, data associated with each video stream and camera can be distributed to each drive. If a drive is lost, the remaining drives have enough information to playback data remaining on each surviving drive.

Strategy for Avoiding Loss of a Common Moment

If every camera's video stream is configured to be recording data at the same framerate (fps), then using the aforementioned "base" method has the potential where each drive may store roughly the same moment captured from the collection of cameras. This could be potentially problematic in that if a drive fails, then a collection of shared moments get lost.

By introducing random offsets or storage cycles, unique for each video frame, a single drive failure would not lose the same moment from all video streams but instead different moments from the collection of video streams. Configurations with overlapping views may still retain critical moments from one camera lost from a peer due to drive failure.

A simple method would be to give each video stream a random initial frame count offset.

$0 \leq c \leq N$

The drive ($D_k$) to store the $j^{th}$ frame of video stream i ($VS_i f_j$) would be $k = (j + c_i) \bmod N$ Further defense against data loss could be gained by randomizing the offset variable 'c' every time a video frame is stored, reducing the risk of a pathological storage pattern that creates a greater risk of losing coincidentally significant frames of video if a single drive fails.

Strategy to Avoid Potential for Regular Loss of Reference Frames

For certain codecs, compression of the video stream is possible by reducing the image data sent to be just what is different from the previous frame. For video streams that are predominantly unchanging scenes, this can be a tremendous savings in network bandwidth and storage overall.

For these codecs to work, they must periodically send a full reference frame (also known as an i-frame), which is a full image captured by the camera. Subsequent frames (e.g., p-frames or b-frames) are sub-rectangles of the base full-frame image or preceding partial images. Full-frames are relatively more important because they insure that a full view of the scene is established. The loss of a single, full-frame is not severe if it is not that different from a previous full-frame image.

If these full-frame images occur regularly (e.g., every 16 or 32 frames, then it is important to have a number of drives which is not an even multiple of that regular period to prevent a single drive failure from taking out a predominant collection of these full frames.

This can be done by having a sufficiently large collection of drives that is not readily divisible by the frequency of full-frames. For example, if a full-frame occurs once every 16 frames, 16 drives could lead to a situation that a single drive failure could take out all of a video stream's full frames. Simply by having one extra drive (17) would mean a single drive failure might affect 1 of every sixteen full-frames and no more.

Leveraging Different Sized Drives While Avoiding Pitfalls of Disproportionate Storage One of the liabilities of traditional RAIDed storage systems is the requirement that to effectively doing erasure coding and mirroring techniques is that all the drives in a disk group must be the same size. At the point of initial purchase, this may not be a big issue as the storage system can easily be configured with the same drive make and model from a manufacturer in bulk. The choice of drive at initial purchase would be based on performance, retention requirements and market pricing against budgets. As the system is put in service and drives fail, the market forces as well as retention requirements might have changed. Drives that fail two to three years after initial deployment might have optimal replacements that have twice the capacity of the original drive. Drives that fail four to five years after initial deployment may no longer have equivalent replacements available. Therefore, there is benefit to allowing for a variable size of drives in the configuration.

To accommodate variability in drive size, the process of allocating new frames of data to drives needs to be proportional to the size of the drive within the collection of available drives to the given stream.

The method of allocating a frame to a drive can be as follows:

When drive is added or removed from the configuration:

$$\alpha \Leftarrow \sum_{N-1}^{i=0} NumberOfBytes(D_i)$$

Initialize a bucket identifier:

A[0]=NumberOfBytes($D_0$);

for each 1≤k≤(N−1),A[i] ⇐ NumberOfBytes(Dk)+A[k−1]

Then for each new frame $vs_jf_i$ do

β ⇐ rand( )* α;

γ ⇐ 0;

δ ⇐ SizeOf($vs_jf_i$)

while A[γ]<β do γ ⇐ γ+1;end;

if NoSpaceAvailable(SpaceNeeded ⇐ δ; OnDrive ⇐ $D_γ$) then

RemoveSpaceBasedOnRetentionStrategy(SpaceNeeded ⇐ δ; OnDrive ⇐ $D_γ$);

end;

write $vs_jf_i$ to $vs_j$ space on drive $D_γ$ end;

In this way, the frames of data for a particular stream will be distributed proportionally across the drives based on the proportion of space on those drives. This method allows larger capacity drives to be added to a configuration.

While this method has the benefit of allowing dynamic allocation of video frames across a plurality of different sized drives, there is a potential for a disproportionately larger collection of video frames to be lost if a single large drive fails. For example, if a configuration only leverages five drives, four of which are 500-gigabytes (GBs) and one is eight-terabytes (TBs), then over time, 80% of the video data will potentially reside on the single eight-terabyte drive, making the configuration vulnerable to a single failure of the 8-TB drive.

If it is assumed that the loss of greater than ϵ% of the video frames begins to render the full video stream less useful, then the solution will benefit by ensuring that no single drive stores greater than ϵ% of the total amount of available video storage of the system. This may be mathematically controlled as follows:

$$\text{Number of discrete drives } N \geq RoundUp\left(\frac{100}{\epsilon}\right)$$

$replacementDriveSize/$ $$((N-1) * averageDriveSize + replacementDriveSize) \leq \epsilon\%$$

$replacementDriveSize \geq$ $$((N-1)averageDriveSize + replacementDriveSize) * \epsilon\%$$

$$replacementDriveSize(1-\epsilon) \geq (N-1)averageDriveSize * \epsilon\%$$

$$replacementDriveSize \leq \frac{(N-1)averageDriveSize * \epsilon\%}{(1-\epsilon\%)}$$

For example, a reasonable number for ϵ% might be 12.5% or one-out-of-eight video frames. That would imply at least 8 available drives to store the video and they would all need to be the same size. If you had a dozen drives, then the largest replacement drive you would want to have could be calculated as follows:

$$replacementDriveSize \leq \frac{(12-1)averageDriveSize * 12.5\%}{(1-12.5\%)} \leq$$

$$\frac{1.375 averageDriveSize}{0.875} \leq 1.57 * averageDriveSize$$

If the original configuration was with 500 GB drives, then the replacement drives could be 785 GB drives without violating our constraint. If we have 48 drives in the original configuration of 500 GB drives, then a replacement drive could be:

$$replacementDriveSize \leq \frac{(48-1)500 \text{ GB} * 12.5\%}{(1-12.5\%)} \leq 3.35 TB$$

In this way, the larger the number of drives also allows for larger disparity in the difference between drives.

Aspects of the disclosure can be implemented in any convenient form. For example, an embodiment may be implemented by one or more appropriate computer programs which may be carried on an appropriate tangible carrier medium. Embodiments of the disclosure may be implemented using suitable apparatus which may specifically take the form of a programmable computer running a computer program arranged to implement a method as described herein.

The descriptions above are intended to be illustrative, not limiting. Thus, it will be apparent to one skilled in the art that modifications may be made to the embodiments as described without departing from the scope of the claims set out below.

The invention claimed is:

1. A computer-implemented method for dynamic distributed allocation of loss-tolerant video data across a plurality of drives for reliable storage and playback, the video data comprising video surveillance data streams of sequential video frames coming from a plurality of cameras, the method comprising:

for each video stream coming from an individual camera, storing the $i^{th}$ video frame $f_i$ to a drive $D_j$, where j=i mod n, where there are a total of 'n' number of drives;

providing a configuration map that keeps track of which video frame coming from which camera is stored in which drive; and during playback, using the configuration map to reconstitute a video stream that came in from a particular camera by collating stored video frames of that video stream retrieved from the 'n' number of drives based on original time sequence of those video frames.

2. The method of claim 1, wherein the method further comprises:

when a particular drive among the plurality of drives is unavailable, skipping that drive while storing the video frames in the remaining (n−1) number of available drives.

3. The method of claim 2, wherein drive unavailability is caused by total or partial failure of the drive requiring a rebuild, or, the drive being off-line for scheduled maintenance.

4. The method of claim 2, wherein the method further comprises:
   updating the configuration map to indicate which drive is unavailable.

5. The method of claim 2, wherein the method further comprises:
   introducing a properly functioning drive to replace the unavailable drive to restore the number of drives available for data recording to 'n,' and initialize the replacement drive so that video frames start recording therein.

6. The method of claim 5, wherein the method further comprises:
   updating the configuration map so that during playback, video frames recorded in the replacement drive are retrieved for reconstituting the video stream.

7. The method of claim 1, wherein the 'n' number of drives are partitioned to improve reliability in video data storage and playback.

8. The method of claim 7, wherein the partition is known to the operating system.

9. The method of claim 8, wherein the configuration map is also known to the operating system.

10. The method of claim 7, wherein the configuration map is known to each of the 'n' drives through a database located in a consistent location on each partition providing information about where each video frame from each video stream is stored.

11. The method of claim 1, wherein a random offset unique to each video frame is introduced to prevent potential loss of a common moment due to failure of a single drive that would otherwise always store video data pertaining to that moment in each storage cycle in the absence of the random offset.

12. The method of claim 1, wherein the number of drives 'n' is not divisible by the frequency of full frames in order to prevent failure of a single drive leading to loss of full-frames in successive storage cycles.

13. The method of claim 1, wherein all of the 'n' number of drives do not have the same size.

14. The method of claim 13, wherein an algorithm is used to allocate newly incoming video frames to individual drives at a rate that is proportional to the relative size of a particular drive within the collection of 'n' number of drives.

15. The method of claim 1, wherein the video data is loss-tolerant, such that a loss of a predetermined percentage ($\epsilon$%) of video frames does not substantially affect the quality of the video stream being reconstituted during playback.

16. The method of claim 15, wherein none of the individual drives stores video data that is more than ($\epsilon$%) of the total amount of available video storage capacity distributed among the 'n' number of drives.

* * * * *